July 8, 1952 H. H. TALBOT 2,602,537
GATHERING TABLE
Filed Nov. 15, 1949
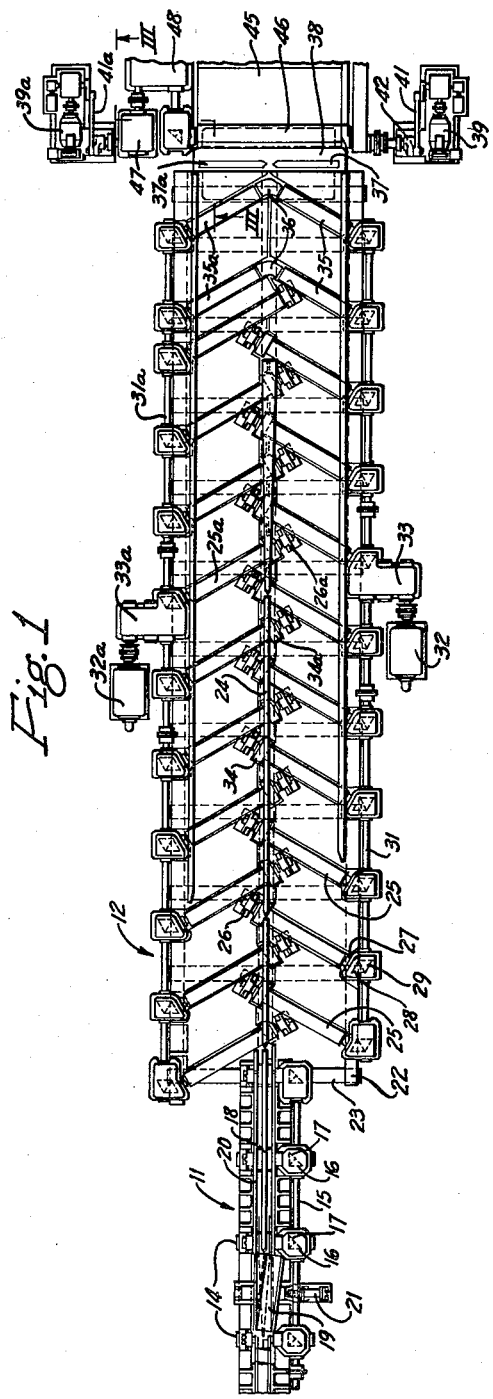
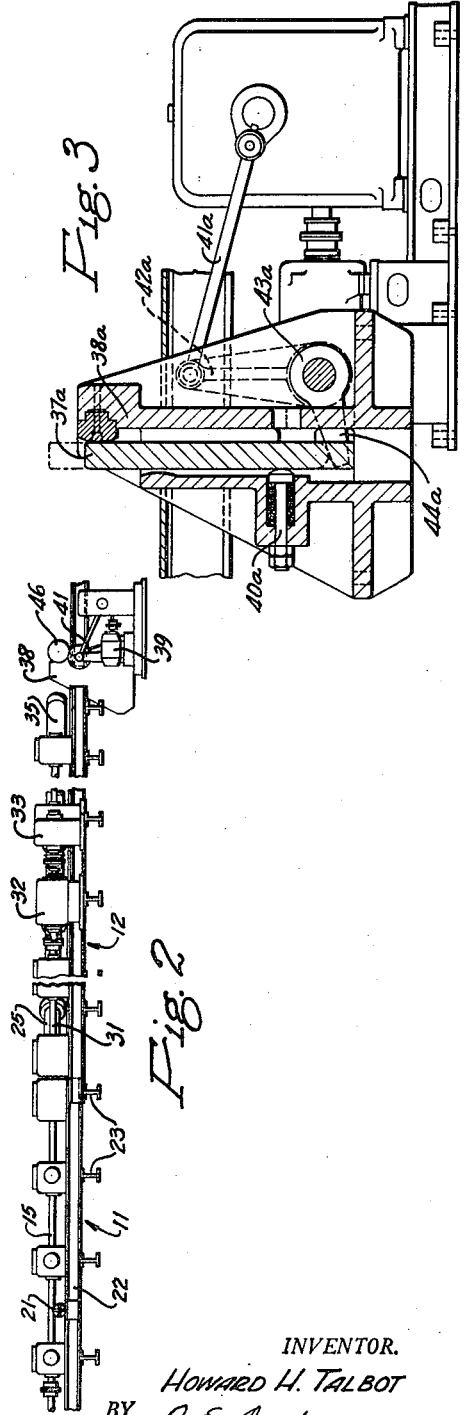
INVENTOR.
HOWARD H. TALBOT
BY J. E. Dickinson
HIS ATTORNEY Patented July 8, 1952

2,602,537

UNITED STATES PATENT OFFICE 2,602,537

GATHERING TABLE

Howard H. Talbot, Allegheny County, Pa., assignor to United Engineering & Foundry Company, Pittsburgh, Pa., a corporation of Pennsylvania Application November 15, 1949, Serial No. 127,351

8 Claims. (Cl. 198—127)

This invention relates to apparatus for continuously receiving and gathering billets and like articles issuing from a shear run-out table at the finishing end of a billet, bar or bloom mill and, in particular, to an improved table conveyor having at least two groups of oppositely disposed driven obliquely positioned rolls, one group of which is adapted to carry articles at the entry speed for a portion of the length of the table and substantially parallel to the center line thereof and the other, a slower speed group, adapted to receive and slow down the rapidly moving articles and to cause them to be deflected diagonally across the conveyor to a common gathering area.

It is one of the objects of this invention to provide a receiving and gathering table adapted to accommodate rapidly moving billets and like articles, without interfering with the continuity of operation of apparatus from which the articles are discharged.

Another object of this invention is to provide a receiving and gathering table adapted, by means of a shifting element, to provide separate areas within which billets and like articles may be grouped for facilitating subsequent handling thereof.

A further object of this invention is to provide a billet and like article receiving and gathering table having driven rolls, the axes of rotation of which are set at an oblique angle with respect to the center line of the table and which, due to the arrangement thereof, are adapted to receive articles at the maximum speed with which they are discharged from next preceding mill apparatus and gather them together in a group.

These objects, as well as the various other novel features and advantages of this invention, will be apparent from the following description and accompanying drawings of which:

Figure 1 is a plan view of a receiving and gathering table embodying the features of the invention herein disclosed, Figure 2 is a side elevation view of the table shown in Figure 1, and Figure 3 is a sectional view taken at III—III of Figure 1.

The apparatus for receiving and gathering billets and like articles, according to the invention herein disclosed, comprises a run-out table over which the articles issuing from a mill, for example, are carried, through a switching element, to one side or the other of a divided table. The table is provided with a plurality of driven rolls supported thereon, over a portion of which the articles may be carried at the speed of delivery thereto, and over the remaining portion thereof at a reduced speed and diagonally of the table for gathering in a compact group.

With reference to the drawings, Figures 1 and 2, there is shown a shear run-out table 11 adjacent to a divided skew table 12 to which billets or the like are directed from the run-out table to be gathered together into groups.

The shear run-out table is provided with a plurality of rollers 14 driven by a common motor through a drive shaft 15 having bevel gears 16 spaced therealong which mesh with and drive similar bevel gears 17 mounted on one end of each of the rollers. At the discharge end of the table 11 and at the center thereof is affixed a longitudinal run-out table dividing member 18 which forms two troughs with the run-out table side guards 20. Pivotally secured to the table and adjacent to the member 18 is a switching element 19 adapted to be adjusted to either of its two extreme positions by means of a double-acting fluid motor 21 attached to the side of the run-out table.

The frame of the skew table 12 comprises two longitudinally extending channels 22 supported by and secured to a plurality of cross members 23. Dividing the skew table into two sections and supported intermittently along its length by the cross members 23 is a tapered sectionalized deflector 24 having the smaller end thereof adjacent to the discharge end of the shear run-out table.

Each half of the table 12 is provided with a plurality of rollers which are so positioned that their axes of rotation are inclined at an angle with respect to the tapered deflector 24. On one side of the table there are rollers 25 which are supported at their inner ends by bearings 26 affixed to the table framework and at their opposite ends in similarly supported bearings 27. To the outer end of each of the rollers 25 is secured a bevel gear 28 in mesh with and driven by a similar bevel gear 29 keyed to a longitudinally extending drive shaft 31 supported by the table and driven by a motor 32 through a gear reduction unit 33. At the inner end of each of the rollers 25 is a collar 34 which is slightly tapered at its outer edge. As will be noted in Figure 1, the collar is positioned beneath and extends for a portion of its width beyond the tapered deflector 24 and into the opposite half of the table. The axes of rotation of the rollers 25 and of the collars 34 thereof are inclined at an angle less than 90° with respect to the central axis of the deflector as measured counter-clockwise from the entry end of the table.

The various elements of the opposite half of the table are similarly supported and numbered with the subscript "a" added thereto, in order to distinguish them from the others. The collars 34a of the rollers 25a extend for a portion of their widths beyond the tapered deflector 24 and into the opposite half of the table containing the rollers 25, the ends of which they overlap. The axes of rotation of the rollers 25a and the collars 34a thereof are inclined at an angle greater than 270° with respect to the central axis of the deflector or table as measured counter-clockwise from the entry end of the table or less than an angle of 90° therefrom as measured clockwise.

At the run-out end of the table there are two sets of rollers 35 and 35a, each driven by their respective drive shafts 31 and 31a and supported at the center of the table in common bearings 36.

At the end of the skew table 12 there are shown two disappearing stops 37 and 37a. Each of the connecting operating elements of the stops are alike in construction and operation and, with the exception of the subscript "a," are similarly numbered. The stop 37a is slidably mounted within a slotted frame 38a and adapted to be raised into the topmost stop position by means of an intermittently operable motor 39a connected through a reciprocating rod 41a to the upper arm 42a of a bell crank 43a pivotally mounted on the frame 38a. The lower arm 44a of the bell crank slidably engages with the bottom of the stop 37a so that when the bell crank is rocked, the stop will be raised to its top position. Near the bottom of the frame is an adjustable spring-pressed pin 40a which is in sliding engagement with and assists in absorbing some of the shock imposed upon the stop 37a each time a billet is stopped thereby.

Beyond the two stops there is a roller table 45, having a plurality of rollers 46 driven by a motor 47 through a gear reduction unit 48, which is adapted to receive material discharged thereto from the skew table.

For purposes of illustration, it will be assumed that the switching element 19 has been positioned, as in Figure 1, for discharging billets from the shear run-out table to the right side of the skew table 12. The billets will be first directed onto the rotating collars 34a attached to the rollers 25a and, due to the lateral component of force acting on the billet caused by having the axes of the rollers and collars inclined at an angle greater than 270° with respect to the central axis of the deflector measured counter-clockwise from the skew table entry end, the billets are caused to hug the deflector for a portion of their travel. However, by reason of the taper of the deflector, the billets are gradually eased toward the collar edges until they finally are caused to drop onto the skewed rollers 25. Since the axes of the rollers 25 are at an angle less than 90° with respect to the central axis of the deflector, measured counter-clockwise, as soon as the billets strike the rollers 25 they are carried across the table and against the table side guard and finally into engagement with the right hand table stop 37. As more billets are added to the table they arrange themselves in side by side relationship until a sufficient number are on hand and then the stop 37 is lowered to permit the gathered billets to pass as a group to the roller table 45. By reason of the fact that the collars are greater in diameter than the rollers, the peripheral speed of the collars can match that of the billets and yet the peripheral speed of the rollers themselves will be somewhat lower, so that the forward speed of the billets will be considerably reduced as soon as the billets are dropped onto the rollers.

To gather billets on the left side of the skew table, the switching element 19 is moved to the left and the billets caused first to pass over at least a portion of the collars 34 from which they are urged by the deflector 24 onto the rollers 25a. The rollers 25a then carry the billets across the table and finally into a stacked relationship against the stop 37a.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. A table for handling and gathering articles comprising a guide, a group of parallel horizontally spaced rotatable rolls having their axes of rotation with respect to said guide disposed at an angle less than 90° measured counter-clockwise with reference to the longitudinal axis of said guide, as measured from the entry end of said table, a second group of rotatable rolls each larger in diameter for a portion of its length at one end than the remainder thereof, the larger diameter portions being interspersed between and having the upper surfaces thereof tangent to a plane above a plane tangent to the upper surfaces of said first group of rolls, said second group of rolls having the axes of rotation thereof disposed at angles greater than 270° measured counter-clockwise with respect to the reference axis of said guide, said guide so disposed with respect to the larger diameter portions of said second group of rolls supporting and conveying articles thereon as to insure contact of the articles with said guide, and so disposed with respect to the remainder of said second group of rolls so as to cause an article fed to the rolls to be urged therefrom and deposited on at least a portion of said first group of rolls.

2. A table for handling and gathering articles comprising a tapered guide, a plurality of horizontally spaced rotatable rolls the axis of rotation of each of which is disposed at an angle less than 90° measured counter-clockwise with reference to the longitudinal axis of said guide as viewed from the entry end of said table, a plurality of longitudinally spaced rotatable rolls having at least a portion thereof of greater diameter than and interspersed between said first mentioned rolls, the axis of rotation of each of said rolls having a larger diameter being disposed at angles greater than 270° measured counter-clockwise with respect to the reference axis of said guide, said guide overlapping said larger diameter portions of said rolls so as gradually to expose a lesser surface of contact of said larger diameter portions of said rolls to said articles, thus to cause articles carried thereby to be urged toward the end of and finally off said rolls and to be deposited on a portion of said first-mentioned rolls.

3. A table comprising a guide, a plurality of horizontally spaced rotatable rolls the axis of rotation of each of which is disposed at an angle less than 90° measured counter-clockwise with reference to the longitudinal axis of said guide as viewed from the entry end of said table, a plurality of longitudinally spaced rotatable rolls having a portion thereof of greater diameter than and interspersed between said first mentioned rolls, the axis of rotation of each of said rolls having portions of greater diameter being disposed at angles greater than 270° measured counter-clockwise with respect to the reference axis of said guide, said rolls having portions of greater diameter being staggered with respect to said guide so as to cause to be exposed a diminishing surface of one roll with respect to the next preceding one thereby to permit an article to be carried forward by a portion of said larger diameter roll portions and finally to be urged therefrom and deposited upon a portion of said first-mentioned rolls.

4. A billet gathering table comprising a group of rolls having the axes thereof disposed at angles of less than 90° measured counter-clockwise with respect to the longitudinal axis of said table, a second group of rolls having the axes thereof disposed at angles less than 90° measured clockwise with respect to the reference axis of said table, each of said second group of rolls having an enlarged equal diameter portion at the ends thereof adjacent said first-mentioned group of rolls, a tapered guide extending along said table and so disposed with respect to said second group of rolls so as to expose less of the peripheral surface of the enlarged diameter portion of succeeding rolls whereby a billet received by said second group of rolls is gradually urged toward and finally off the end of said rolls and deposited upon said first group of rolls.

5. A billet gathering table comprising a group of rolls having the axes thereof disposed at angles of less than 90° measured counter-clockwise with respect to the longitudinal axis of said table, common driving means for rotating said rolls, a second group of rolls having the axes thereof disposed at angles less than 90° with respect to the reference axis of said table, common driving means for rotating said second group of rolls, each of said second group of rolls having an enlarged equal diameter portion at the ends thereof adjacent said first-mentioned group of rolls, a tapered guide extending along said table and so disposed with respect to said second group of rolls so as to expose less of the peripheral surface of the enlarged diameter portion of succeeding rolls whereby a billet received by the enlarged diameter portion of said second group of rolls is gradually urged toward and finally off the end of said rolls and deposited upon said first group of rolls.

6. A billet gathering table comprising a group of rolls having the axes thereof disposed at angles of less than 90° measured counter-clockwise with respect to the longitudinal axis of said table, a second group of rolls the ends of which lie in staggered overlapping relationship with respect to said first group of rolls and having the axes thereof disposed at angles less than 90° measured clockwise with respect to the reference axis of said table, collars secured to the overlapping ends of said groups of rolls, a guide extending along said table and so disposed with respect to said collars so as to expose less of the peripheral surface of succeeding collars whereby a billet deposited upon the collars of one group of rolls will be gradually urged therefrom and deposited upon said other group of rolls.

7. A billet gathering table comprising a group of rolls having the axes thereof disposed at angles of less than 90° measured counter-clockwise with respect to the longitudinal axis of said table, a second group of rolls the ends of which lie in staggered overlapping relationship with respect to said first group of rolls and having the axes thereof disposed at angles less than 90° measured clockwise with respect to the reference axis of said table, collars secured to the overlapping ends of said groups of rolls, guide means for directing billets onto one or the other of said groups of collars, a guide extending along said table and so disposed with respect to said collars so as to expose less of the peripheral surface of succeeding collars whereby a billet deposited upon the collars of one group of rolls will be gradually urged therefrom and deposited upon said other group of rolls.

8. Apparatus according to claim 7 wherein is provided means for interrupting movement of said billets along the rolls of said table.

HOWARD H. TALBOT.

REFERENCES CITED

The following references are of record in the file of this patent:

UNITED STATES PATENTS

| Number | Name | Date |
|--------|------|------|
| 744,874 | Neeland | Nov. 24, 1903 |
| 1,228,543 | Edwards | June 5, 1917 |
| 2,030,816 | Fenton | Feb. 11, 1936 |